US006622266B1

(12) United States Patent
Goddard et al.

(10) Patent No.: US 6,622,266 B1
(45) Date of Patent: Sep. 16, 2003

(54) METHOD FOR SPECIFYING PRINTER ALERT PROCESSING

(75) Inventors: Joan Stagaman Goddard, Boulder, CO (US); Thomas Michael Ruehle, Boulder, CO (US); Susan Ruth Scruggs, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 09/592,479

(22) Filed: Jun. 9, 2000

(51) Int. Cl.[7] .............................................. G06F 11/00
(52) U.S. Cl. .............................. 714/44; 714/48; 714/57
(58) Field of Search ............................... 714/44, 57, 48

(56) References Cited

U.S. PATENT DOCUMENTS

| 5,727,135 | A | | 3/1998 | Webb et al. ................. 395/113 |
|---|---|---|---|---|
| 5,748,884 | A | | 5/1998 | Royce et al. ............. 395/185.1 |
| 5,819,110 | A | | 10/1998 | Motoyama ................... 395/835 |
| 5,873,659 | A | | 2/1999 | Edwards et al. .............. 400/61 |
| 5,909,493 | A | | 6/1999 | Motoyama ..................... 380/25 |
| 6,298,457 | B1 | * | 10/2001 | Rachlin et al. ................ 714/49 |
| 6,370,577 | B1 | * | 4/2002 | Hattori et al. ................. 714/57 |
| 6,384,848 | B1 | * | 5/2002 | Kojima et al. .............. 345/808 |
| 6,438,716 | B1 | * | 8/2002 | Snover .................... 144/134.1 |
| 6,477,667 | B1 | * | 11/2002 | Levi et al. ................... 345/808 |
| 6,526,524 | B1 | * | 2/2003 | Kelley ........................... 714/38 |

FOREIGN PATENT DOCUMENTS

| JP | 07297826 | A | 11/1995 | .......... H04L/12/24 |
|---|---|---|---|---|
| JP | 08008927 | A | 1/1996 | .......... H04L/12/28 |
| JP | 08044255 | A | 2/1996 | .......... G03G/21/00 |
| JP | 08202509 | A | 8/1996 | ............. G06F/3/12 |
| JP | 10187498 | A | 7/1998 | ............. G06F/1/30 |
| JP | 10217530 | A | 8/1998 | ............ B41J/29/38 |
| JP | 10269038 | A | 10/1998 | ............. G06F/3/12 |

OTHER PUBLICATIONS

*Generic Alerter Service*, IBM Technical Disclosure Bulletin, Jun. 1992, pp. 335–336.

* cited by examiner

Primary Examiner—Scott Baderman
Assistant Examiner—Anne L Damiano
(74) Attorney, Agent, or Firm—Scott W. Reid; Bracewell & Patterson, LLP

(57) ABSTRACT

A user interface is provided to receive electronic mail addresses for printer alert notification recipients. The alert notifications to be received by each individual recipient are designated based on the underlying alert condition prompting the alert. Once all desired recipients and corresponding alert notifications have been specified, this alert notification configuration is implemented for one or more printers within a group of monitored printers.

9 Claims, 4 Drawing Sheets

METHOD FOR SPECIFYING PRINTER ALERT PROCESSING

BACKGROUND OF THE INVENTION

1. Technical Field

The present invention relates generally to configuration of printer alert processing and in particular to specification of alert notifications for printer alert conditions. Still more particularly, the present invention relates to designating different electronic mail addresses to be utilized for different alert notifications by a number of printers.

2. Description of the Related Art

A data processing system network for an enterprise will typically include a number of printers and other output devices. Printer administrators for the enterprise are generally responsible for responding to problems with printers, such as low toner or paper jams. Printer management software reports these problems by various mechanisms, such as color change or other alteration of the printer icon, audible cues, or generation of messages.

For an enterprise with a large number of printers, specification of alert processing is complicated by two factors: First, configuration of printers for alert processing generally must be done manually, which may be time-consuming. Second, in many cases the individual who responds to one type of alert for a printer may be different from the individual who responds to other types of alerts. Therefore, not only does alert processing need to be specified individually for each printer, but alert notifications for different types of error or alert conditions also need to be specified individually at each printer.

It would be desirable, therefore, to improve the efficiency of specifying or changing alert notifications for printers within an enterprise. Furthermore, it would also be advantageous to improve the efficiency of specifying the targets for specific alert notifications across multiple printers within an enterprise.

SUMMARY OF THE INVENTION

It is therefore one object of the present invention to provide improved configuration of printer alert processing.

It is another object of the present invention to provide improved specification of alert notifications for printer alert conditions.

It is yet another object of the present invention to provide a mechanism for designating different electronic mail addresses to be utilized for different alert notifications by a number of printers.

The foregoing objects are achieved as is now described. A user interface is provided to receive electronic mail addresses for printer alert notification recipients. The alert notifications to be received by each individual recipient are designated based on the underlying alert condition prompting the alert. Once all desired recipients and corresponding alert notifications have been specified, this alert notification configuration is implemented for one or more printers within a group of monitored printers.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

This invention is described in a preferred embodiment in the following description with reference to the figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the present invention with appropriate standard computer hardware to execute the code contained therein. An apparatus for practicing the invention could be one or more computers and storage systems containing or having network access to computer program(s) coded in accordance with the invention.

Figure 1:
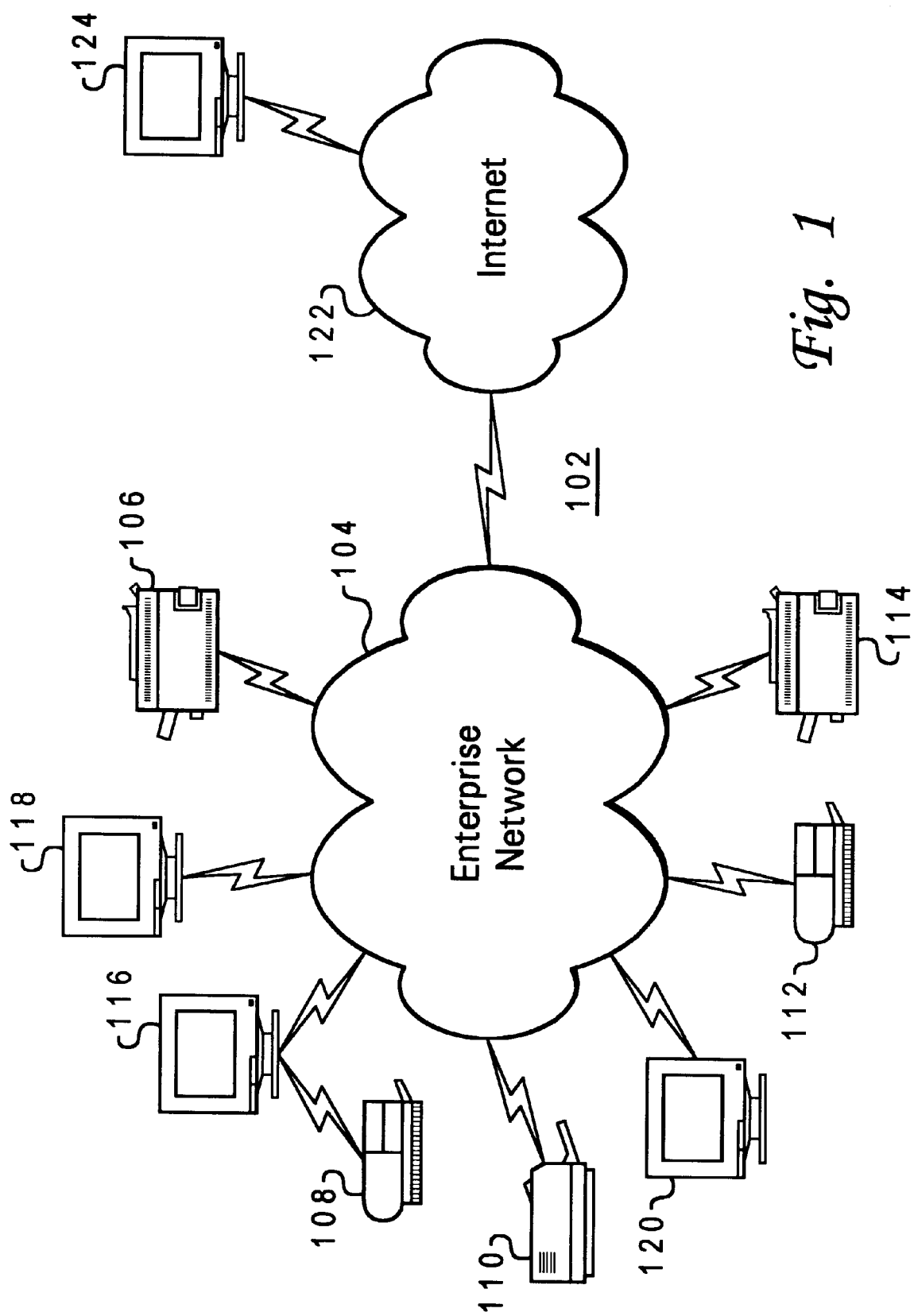
FIG. 1 depicts a data processing system network in which a system for specifying printer alert notifications in accordance with a preferred embodiment of the present invention may be implemented.

With reference now to the figures, and in particular with reference to FIG. 1, a data processing system network in which a system for specifying printer alert notifications in accordance with a preferred embodiment of the present invention may be implemented is depicted. Data processing system network 102 includes an enterprise network 104, which may be a local area network (LAN) or a wide area network (WAN) in accordance with the known art. A plurality of printers and other output devices, including printers 106, 108, 110, 112, and 114, are connected to enterprise network 104. The printers may be either directly connected to enterprise network 104, as in the case of printers 106, 110, 112, and 114 depicted in FIG. 1, or connected to a data processing system serving as an interface between the printer and enterprise network 104, as in the case of printer 108 connected to data processing system 116.

The printers connected to enterprise network 104 may be of different types—that is, different printers produced by different manufacturers or different models produced by a single manufacturer. In the example depicted, printers 106 and 114 are of a first manufacturer/model type, printers 108 and 112 are of a second manufacturer/model type, and printer 110 is of a third manufacturer/model type. Each manufacturer/model type includes printers designed to be compatible with that type, even if produced by different manufacturers.

Printers 106, 108, 110, 112, and 114 may be shared (accessible to multiple users) or private (accessible to only a single user). In the exemplary embodiment, printers 106, 110, 112, and 114 are depicted as shared printers while printer 108 is depicted as a private printer. Accordingly, printers 106, 110, 112, and 114 are accessible as output devices to users logged in at data processing systems 116, 118, and 120 (assuming the users have appropriate privileges), while printer 108 is only accessible as an output device to a user logged in at data processing system 116. However, printers 106, 108, 110, 112, and 114 may all communicate alert notifications to any of data processing systems 116, 118, or 120 across network 102. Network 102 also includes a communications connection allowing alert notifications to be transmitted to external entities, such as a connection to Internet 122 enabling communications with a user at an external data processing system 124.

Figure 2:
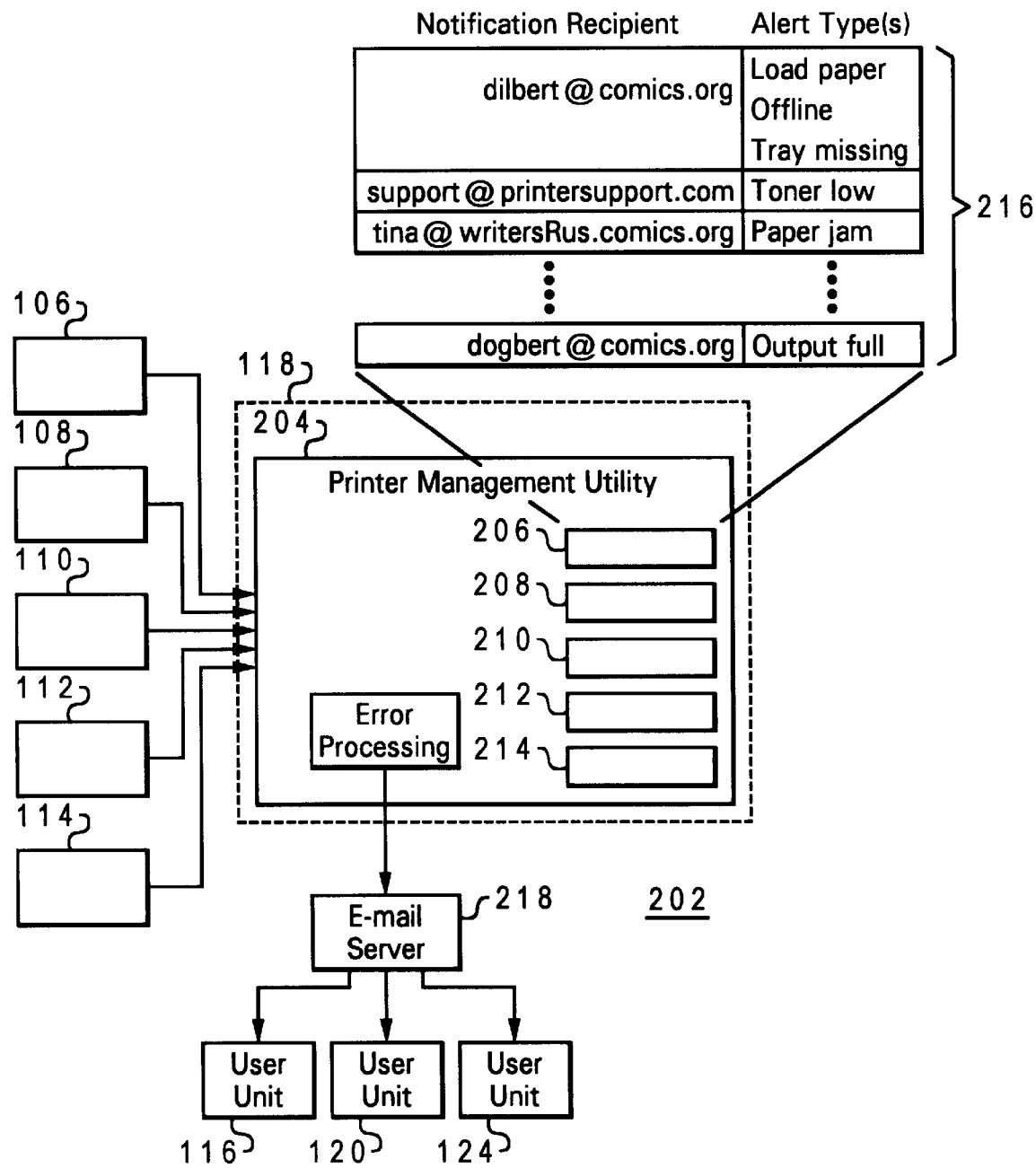
FIG. 2 is a block diagram of a system for specifying printer alert processing in accordance with a preferred embodiment of the present invention.

Referring to FIG. 2, a block diagram of a system for specifying printer alert processing in accordance with a preferred embodiment of the present invention is illustrated. System 202 includes a printer management utility 204 executing within a data processing system (such as data processing system 118) connected to the enterprise network (network 104 in FIG. 1) and enabling an enterprise printer administrator to configure and monitor the operation of printers 106, 108, 110, 112, and 114. Printer management utility 204 is employed by the enterprise printer administrator to configure alert notifications within printer configuration data 206, 208, 210, 212, and 214 for printers 106, 108, 110, 112, and 114.

Printer alert notifications must be transmitted utilizing some form of messaging facility, which in the exemplary embodiment is electronic mail. The enterprise printer administrator configures alert notifications for printers 106, 108, 110, 112, and 114 by specifying e-mail addresses 216 of individuals designated to receive at least one printer alert notification, together with each of the printer alert notification(s) which that individual is to receive. For example, one user—e.g., an enterprise employee working near the printer's physical location—may receive alert notifications for simple problems which are easily fixed, such as an empty paper tray, the printer being offline, or a paper tray being missing. Another user, such as an enterprise systems maintenance person, may receive the alert notification when the toner within the printer is low. Still another user may receive notifications requiring significant technical expertise to correct, such as an internal paper jam or other internal problem. Individuals receiving alert notifications may be enterprise employees connected to the enterprise network, or outside support vendors providing on-call support for printer problems.

With an enterprise of any significant size, certain types of printer support may be performed by a single enterprise employee. For example, a systems maintenance employee may be responsible for replacing toner cartridges in all enterprise printers (or at least all enterprise printers within a given building). Similarly, a particular outside support vendor may be engaged by the enterprise to service mechanical failures for any enterprise printers. When such an employee or vendor is changed, the burden of altering alert notification configurations could be reduced by allowing all affected printers within the enterprise to be concurrently reconfigured.

Printer configuration data 206, 208, 210, 212, and 214 all include alert notification information 216 for the corresponding printer, a list of electronic mail (e-mail) addresses for individuals designated to receive at least one alert notification and, for each e-mail address, an associated identification of each alert type for which an alert notification should be transmitted to the respective address. Each e-mail address therefore receives alert notifications only for the alert types associated with the e-mail address within alert notification information 216. Different e-mail addresses within alert notification information 216 may be configured to receive alert notifications for different sets of alert types. The same alert type, however, may be specified to prompt an alert notification to more than one e-mail address within alert notification information 216.

In the present invention, alert notifications may be specified or changed simultaneously for multiple printers within printers 106, 108, 110, 112, and 114. The alert notification configuration information 216 is specified by the printer administrator utilizing printer management utility 204. In the exemplary embodiment, the printer administrator may selectively configure only a single printer, or simultaneously configure all currently monitored printers which have not previously been configured. However, the exemplary embodiment could be readily extended to allow selection of an arbitrary group of printers for simultaneous alert notification configuration.

Because printers of different types may not all utilize exactly the same set of alert conditions, printer management utility 204 preferably implements configuration of alert notification recipients for all possible alert conditions for any enterprise printer to be configured utilizing printer management utility 204. Equivalent alert conditions (e.g., "toner low" and "cartridge missing") may be treated as a single alert type. The printer administrator may specify alert notifications for any or all of the alert conditions or alert types accessible through printer management utility 204. In writing the notification addresses to the printer configuration data, if a particular enterprise printer does not employ an alert type for which a notification is specified, printer management utility 204 simply skips that alert type for that printer. Printer management utility 204 may also copy an existing alert notification configuration from one printer to another.

Once configured, when an error or alert condition is detected for one of printers 106, 108, 110, 112, and 114, printer management utility 204 transmits e-mail printer alert notifications to enterprise e-mail server 218, addressed to the individual specified for the fault condition which generated the printer alert. E-mail server 218 forwards the alert notifications to the appropriate user unit 116, 120, or 124 where the corresponding individual is logged in.

Figure 3:
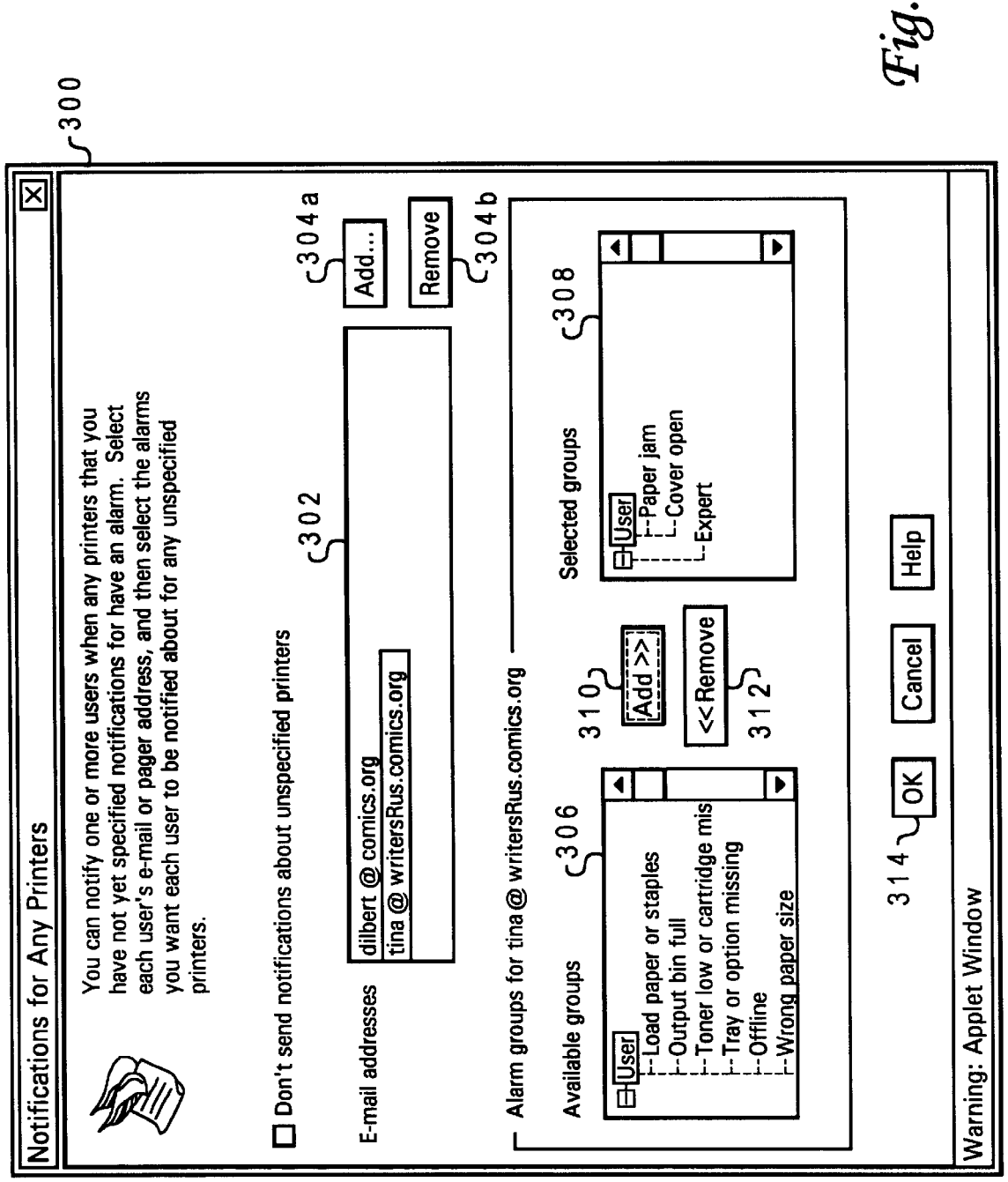
FIG. 3 depicts a user interface dialog for specifying printer alert processing in accordance with a preferred embodiment of the present invention.

With reference now to FIG. 3, a user interface dialog for specifying printer alert processing in accordance with a preferred embodiment of the present invention is depicted. The user interface dialog 300 which is depicted is employed by the printer administrator after having initiated concurrent configuration of one or more unconfigured enterprise printers. Although in the example depicted, user interface dialog 300 is employed to configure alert notifications for all printers which have not previously been configured (e.g., one or more new printers or printers in a new local area network), essentially the same user interface could be employed in a system for configuring arbitrarily selected groups of printers.

User interface dialog 300 includes a display 302 of the e-mail addresses for recipients of at least one alert notification. E-mail addresses may be added to or removed from display 302 utilizing add/remove controls 304a–304b. User interface dialog 300 also includes a display 306 of all possible alert conditions for which notifications are sent. In the example shown, this includes all possible printer alert conditions for any printer within the enterprise.

To configure alert notifications, the printer administrator highlights the e-mail address of a recipient ("tina@writersRus.comics.org" in the example shown) within display 302. User interface dialog 300 will then generate a display 308 of all alert notifications which the selected recipient is currently configured to receive. The printer administrator may then add alert notifications for the selected recipient by highlighting the notification to be added within display 306 and actuating add control 310. Similarly, the printer administrator may remove alert notifications for the selected recipient by highlighting the notification to be removed within display 308 and actuating remove control 312. Once the printer administrator has made all desired alert processing changes for the selected group of printers, the changes are implemented within all previously unconfigured enterprise printers.

Figure 4:
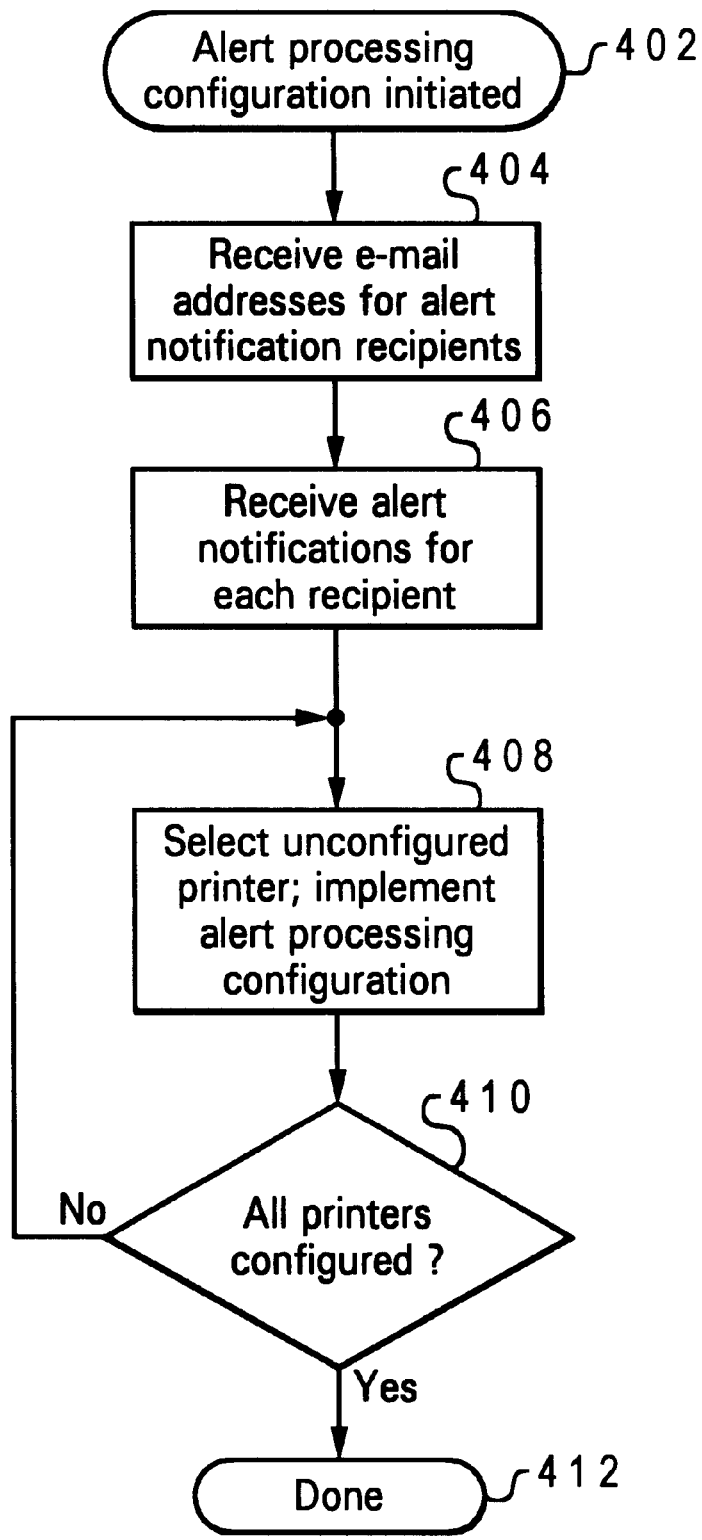
FIG. 4 is a high level flow chart for a process of specifying printer alert processing in accordance with a preferred embodiment of the present invention.

Referring to FIG. 4, a high level flow chart for a process of specifying printer alert processing in accordance with a preferred embodiment of the present invention is illustrated. The process begins at step 402, which illustrates printer alert processing configuration being initiated. The process first passes to step 404, which illustrates receiving a list of e-mail addresses for intended recipients of at least one alert notification. The "list" may comprise only a single e-mail address, or may include two or more e-mail addresses. The process then passes to step 406, which depicts receiving, for each individual recipient identified, the alert notification(s) to be received by that recipient.

The process passes next to step 408, which illustrates selecting a previously unconfigured enterprise printer and implementing the alert processing configuration (or configuration changes) which were received. The process then passes to step 410, which depicts a determination of whether all printer s within the enterprise which are being monitored have alert notification configurations. If not, the process returns to step 410 for selection and configuration of anther (previously unconfigured) printer within the group of printers being monitored. If so, however, the process proceeds instead to step 412, which depicts the process terminating.

The present invention allows alert processing for a group of printers to be configured concurrently, but also allows different recipients to be designated for notification of different alert conditions or alert types. In an enterprise with a significant number of printers and one or more employees or outside support vendors tasked for particular types of printer support, substantial savings of time in configuring alert processing may be achieved. The ability to specify particular alert conditions which will result in notifications to a particular recipient across all monitored printers within an enterprise allows global replacement or change in alert notification recipients for specific alert types.

The present invention may be employed to "copy" alert processing configurations (for example, by selecting a printer having the desired configuration and an unconfigured printer, then implementing the first printer's initial configuration in both printers). Although the exemplary embodiment is described in the context of printers, other types of output devices such as plotters may also be supported. Similarly, although electronic mail is employed within the exemplary embodiment, other messaging facilities such as network broadcasts or instant messaging may be utilized instead.

While the invention has been particularly shown and described with reference to a preferred embodiment, it will be understood by those skilled in the art that various changes in form and detail may be made therein without departing from the spirit and scope of the invention.

What is claimed is:

1. A method for providing printer alert notification to users within a computer network having a plurality of printers, said method comprising:

receiving a list of user email addresses designated to receive printer alert notifications, wherein each of said user email addresses is associated with at least one specific alert type a respective user intended to receive;

associating said list of user email addresses to each of said plurality of printers within said computer network;

in response to a detection of an occurrence of an error condition on one of said plurality of printers, transmitting an alert notification to an email server within said computer network, wherein said alert notification includes said list of user email addresses; and transmitting said alert notification by said email server to users on said list of user email addresses that are currently logged on to said computer network.

2. The method of claim 1, wherein said receiving further comprises:

receiving a first email address and a first set of alert types for which a notification is to be transmitted said first address; and receiving a second email address and a second set of alert types for which a notification is to be transmitted said second address, wherein said second set of alert types differs from said first set of alert types.

3. The method of claim 1, wherein said at least one specific alert type includes load paper, offline, tray missing, toner low or paper jam.

4. A computer program product residing on a computer usable medium for providing printer alert notification to users within a computer network having a plurality of printers, said computer program product comprising:

program code means for receiving a list of user email addresses designated to receive printer alert notifications, wherein each of said user email addresses is associated with at least one specific alert type a respective user intended to receive;

program code means for associating said list of user email addresses to each of said plurality of printers within said computer network;

program code means for transmitting an alert notification to an email server within said computer network, in response to a detection of an occurrence of an error condition on one of said plurality of printers, wherein said alert notification includes said list of user email addresses; and program code means for transmitting said alert notification by said email server to users on said list of user email addresses that are currently logged on to said computer network.

5. The computer program product of claim 4, wherein said program code means for receiving further comprises:

program code means for receiving a first email address and a first set of alert types for which a notification is to be transmitted said first address; and program code means for receiving a second email address and a second set of alert types for which a notification is to be transmitted said second address, wherein said second set of alert types differs from said first set of alert types.

6. The computer program product of claim 4, wherein said at least one specific alert type includes load paper, offline, tray missing, toner low or paper jam.

7. An apparatus for providing printer alert notification to users within a computer network having a plurality of printers, said apparatus comprising:

means for receiving a list of user email addresses designated to receive printer alert notifications, wherein each of said user email addresses is associated with at least one specific alert type a respective user intended to receive;

means for associating said list of user email addresses to each of said plurality of printers within said computer network;

means for transmitting an alert notification to an email server within said computer network, in response to a detection of an occurrence of an error condition on one of said plurality of printers, wherein said alert notification includes said list of user email addresses; and means for transmitting said alert notification by said email server to users on said list of user email addresses that are currently logged on to said computer network.

8. The apparatus of claim 7, wherein said means for receiving further comprises:

means for receiving a first email address and a first set of alert types for which a notification is to be transmitted said first address; and means for receiving a second email address and a second set of alert types for which a notification is to be transmitted said second address, wherein said second set of alert types differs from said first set of alert types.

9. The apparatus of claim 7, wherein said at least one specific alert type includes load paper, offline, tray missing, toner low or paper jam.

* * * * *